Oct. 5, 1971     M. J. WOODWARD     3,609,863
TRANSVERSELY ADJUSTABLE SCISSOR STRUCTURE
Filed Jan. 2, 1970
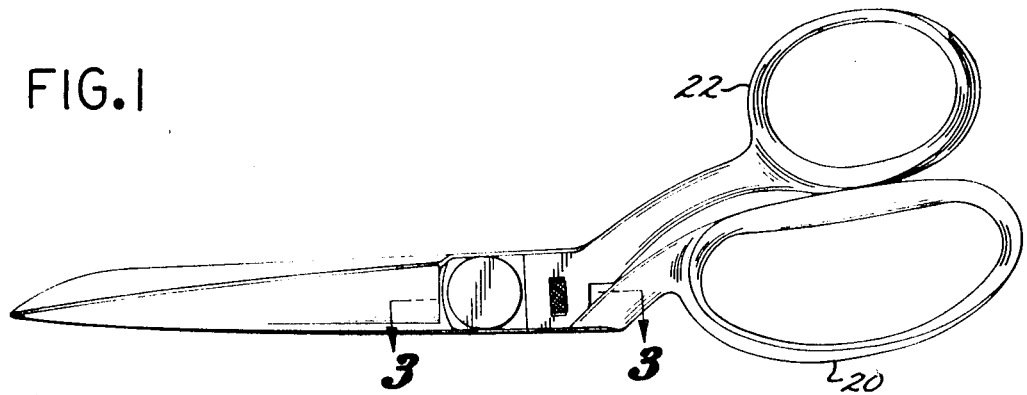
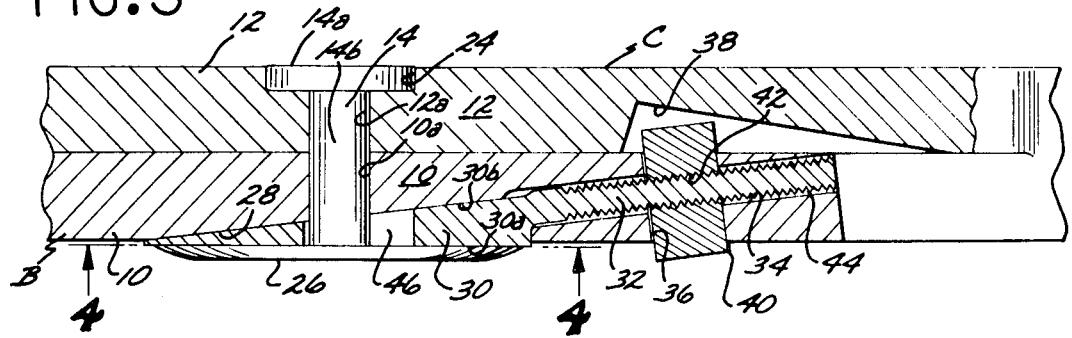
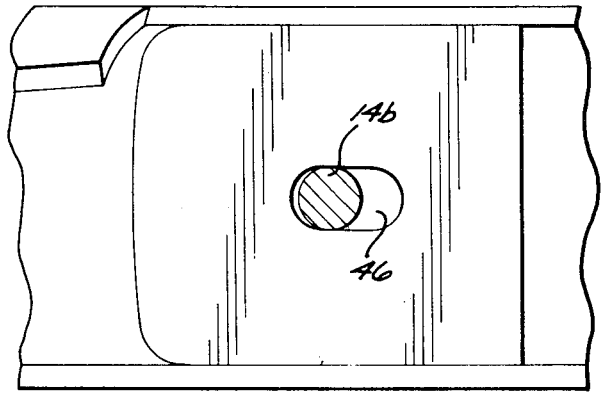
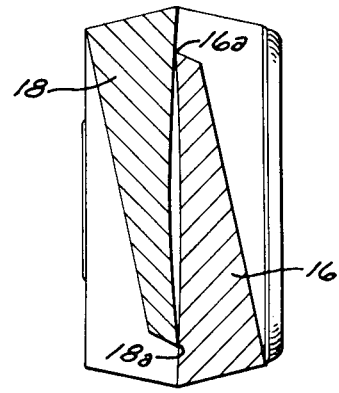
INVENTOR.
MITCHELL J. WOODWARD
BY
William C. Babcock
ATTORNEY

United States Patent Office 3,609,863
Patented Oct. 5, 1971

3,609,863
TRANSVERSELY ADJUSTABLE SCISSOR STRUCTURE
Mitchell J. Woodward, 9136 Artesia Blvd.,
Bellflower, Calif. 90706
Filed Jan. 2, 1970, Ser. No. 51
Int. Cl. B26b 13/28
U.S. Cl. 30—266                             4 Claims

ABSTRACT OF THE DISCLOSURE

A scissor structure that has two elongate pivotally connected members on which cutting edges are defined, with the structure being characterized by manually adjustable means mounted thereon that force the cutting edges into desired pressure contact with one another to improve the cutting capability of the scissor structure.

BACKGROUND OF THE INVENTION

Field of the invention

A scissor structure that includes manually adjustable means for forcing the cutting edges of the blades into a desired degree of pressure contacts.

Description of the prior art

Scissors, as is well known, are made in a variety of materials ranging from cloth to light sheet metallic sizes and styles, and are used for cutting material. Scissors, irrespective of their size and the material on which they are intended to be used, include two elongate members that are pivotally secured together in crossed relationship, with cutting edges being defined on the members on one side of the pivotal connection, and handles for actuating the members on the other side thereof.

Scissors operate most efficiently in cutting sheet material, when the cutting edges thereof are in substantial pressure contact. After a pair of scissors has been used for a prolonged period of time wear occurs on the cutting edges that are in slidable engagement, as well as the pin that pivotally secures the members together in crossed relationship, and as a result the cutting edges have little or no transverse pressure contact with one another. This lack of transverse pressure contact on the cutting edges as they move into slidable contact with one another results in the scissors having poor cutting characteristics.

The purpose of the present invention is to provide manually adjustable means on the scissors to permit the cutting edges thereof to be forced into transverse pressure contact with one another to a desired degree, and this degree of pressure contact being maintainable irrespective of the wear that may have occurred on the cutting edges, or the pivotal means securing the members together. By so adjusting the cutting edges transversely, the scissors have substantially constant cutting characteristics irrespective of wear thereon, and the scissors consequently overcome the operational disadvantages of prior art devices of this nature.

SUMMARY OF THE INVENTION

A pair of scissors that includes two elongate members that have center portions that are pivotally secured together by a rivet or the like, with the elongate members having cutting edges defined on first forward portions thereof, and handles for actuating said members on second rearward portions thereof. The scissors are provided with a flat plate secured to the rivet that extends through openings in said center portions of said members, with said plate being slidably engaged by a rigid body, and the rigid body also slidably engaging a recessed tapered longitudinally extending surface defined in the outer part of a first of said center portions. An elongate shank extends from said body through a bore formed in the one of said members on which said recessed surface is formed. Manually actuatable means are provided to move said body and shank longitudinally relative to said tapered surface to cause a desired transverse force to be exerted by the cutting edges on one another as the members are pivoted in a cutting operation.

BRIEF DESCRIPTION OF THE DRAWING

FIG. 1 is a side elevational view of a pair of scissors provided with the manually adjustable means that control the degree of pressure contact on the cutting edges thereof;

FIG. 2 is a top plan view of the scissors;

FIG. 3 is an enlarged fragmentary longitudinal cross-rectional view of the scissors taken on the line 3—3 of FIG. 1;

FIG. 4 is an enlarged fragmentary side elevational view of the scissors taken on the line 4—4 of FIG. 3; and FIG. 5 is a transverse cross-sectional view of the scissors taken on the line 5—5 of FIG. 2.

DESCRIPTION OF THE PREFERRED EMBODIMENTS

The invention as may best be seen in FIGS. 1–3 is a pair of scissors A that includes first and second elongate members that are pivotally connected at first and second central portions 10 and 12 thereof by a rivet or pin 14. The first and second members B and C on forward portions 16 and 18 thereof are formed with hollow ground cutting edges 16a and 18a, which cutting edges are most effective in cutting sheet material when said edges are maintained in pressure contact with one another.

The first and second members B and C on second rearward end portions thereof develop into first and second handles 20 and 22 that are preferably in the form of loops as shown in FIG. 1 that may be engaged by the thumb and forefinger (not shown) of the user. The rivet 14 as may best be seen in FIG. 3 extends through transversely aligned bores 10a and 12a formed in the first and second central portions 10 and 12, with the rivet 14 having a head 14a on one end thereof that is seated in a circular cavity 24 formed on the outer surface of the second central portion 12 as shown in FIG. 3. The rivet 14 on the end thereof opposite to that which supports the head 14a, supports a flat circular plate 26 that is best seen in FIG. 3. The shank of the rivet 14 is identified on the drawings by the numeral 14b.

The central portion 10 as may best be seen in FIG. 3 has an elongate recessed surface 28 formed on the exterior thereof that tapers towards the second central portion 12. An elongate rigid body 30 is provided that has a flat surface 30a in contact with the interior surface of the plate 26, and a second tapered longitudinally extending surface 30b that slidably contacts the surface 28. An elongate threaded shank 32 extends rearwardly from the body 30, with the shank being slidably movable in an elongate bore 34 formed in the first central portion 10. The bore 34 tapers towards the second central portion 12.

A transverse slot 36 is formed in the first central portion 10, and is in communication with the bore 34. The second central portion 12 as may best be seen in FIG. 3 has a longitudinally extending recess 38 formed therein adjacent to the slot 36. A nut 40 is provided that snugly engages the slot 36 and is rotatable therein. The nut 40 as may best be seen in FIG. 3 extends into the recess 38. The nut 40 includes a tapered bore 42 that engages threads 44 formed on the shank 32. Body 30 is provided with an elongate slot 46 that slidably engages the rivet shank 14b as may best be seen in FIGS. 3 and 4, to maintain the body 30 in longitudinal alignment with the first and second members B and C.

When the nut 40 is manually rotated, the shank 32 and body 30 are moved relative to the surfaces 30a and 30b. When the body 30 is moved in an appropriate direction, the first and second members B and C will be forced into greater transverse pressure contact with one another. Also, the cutting edges 16a and 18a will be forced into increased pressure contact. This increased pressure contact of the edges 16a and 18a improve the cutting capability of the scissors A. By manipulation of the nut 40, the magnitude of pressure contact between the cutting edges 16a and 18a may be either increased or decreased. This adjustment is particularly useful, as the most efficient cutting of different sheet materials is when the cutting edges 16a and 18a are in a particular degree of pressure contact.

The use and operation of the invention has previously been described in detail and need not be repeated.

I claim:

1. In combination with a pair of scissors that include two crossed first and second elongate members that have flat first and second central portions in pivotal sliding contact, said members having slidably engageable cutting edges defined thereon forwardly from said central portions, and handles on said members rearwardly from said central portions for manually pivoting said cutting edges relative to one another, a pin that extends through transversely aligned openings in said central portions to permit said elongate members to be pivoted relative to one another, a device for adjustably holding said cutting edges in a desired transverse pressure contact as said elongate members are pivoted in a cutting operation, said device including:

(a) a flat plate secured to one end of said pin and adjacently disposed to an elongate longitudinal recessed tapered surface formed in an external part of said first central portion;

(b) an elongate body that has a first flat surface parallel to the interior surface of said plate and in sliding contact therewith, and a second tapered surface in slidable contact with said recessed tapered surface;

(c) an elongate shank that extends from said body through a longitudinal bore in said first central portion; and (d) manually operable means mounted on said first member which in cooperation with said shank move said shank and body longitudinally relative to said tapered recessed surface to adjust the transverse pressure contact between said cutting edges to a desired degree to improve the cutting characteristics thereof.

2. The combination defined in claim 1 in which said shank has threads formed thereon, and said means is a nut rotatably and snugly supported in a transverse slot in said first central portion, which slot is in communication with said bore, said nut in engagement with said threads on said shank, and said nut when rotated moving said shank and body longitudinally relative to said recessed tapered surface.

3. The combination as defined in claim 2 in which said central portion has a cavity into which a portion of said nut extends.

4. The combination as defined in claim 2 in which said body has an elongate longitudinal slot therein that slidably engages said pin to maintain said body in longitudinal alignment with said first member.

References Cited

UNITED STATES PATENTS

| | | | |
|---|---|---|---|
| 938,630 | 11/1909 | Baur | 30—266 |
| 951,236 | 3/1910 | Crider | 30—266 |
| 1,005,606 | 10/1911 | Craig | 30—266 |
| 1,152,633 | 9/1915 | Holtgrave | 30—266 |

ROBERT C. RIORDON, Primary Examiner

J. C. PETERS, Assistant Examiner

U.S. Cl. X.R.

287—101